J. VAN WINKLE & F. DONNELLY.
Insulating Compound for Telegraph Wires.

No. 228,005.                    Patented May 25, 1880.

WITNESSES:
Francis McArdle.
James H. Hunter.

INVENTORS:
John Van Winkle,
Felix Donnelly,
BY E. R. Brown,
ATTORNEY

UNITED STATES PATENT OFFICE.

JOHN VAN WINKLE AND FELIX DONNELLY, OF JERSEY CITY, NEW JERSEY.

INSULATING COMPOUND FOR TELEGRAPH-WIRES.

SPECIFICATION forming part of Letters Patent No. 228,005, dated May 25, 1880.

Application filed September 26, 1879.

*To all whom it may concern:*

Be it known that we, JOHN VAN WINKLE and FELIX DONNELLY, of Jersey City, in the county of Hudson and State of New Jersey, have invented certain new and useful Improvements in Insulating Compounds for Insulating Telegraph-Wires; and we do hereby declare that the following is a full, clear, and exact description of the invention.

Our invention relates to an improved compound for insulating telegraph-wires; and it consists in a combination of coal-tar, pitch, tallow, and potash, as will be fully hereinafter described.

The accompanying drawings illustrate the manner of carrying out our invention.

Figure 1:
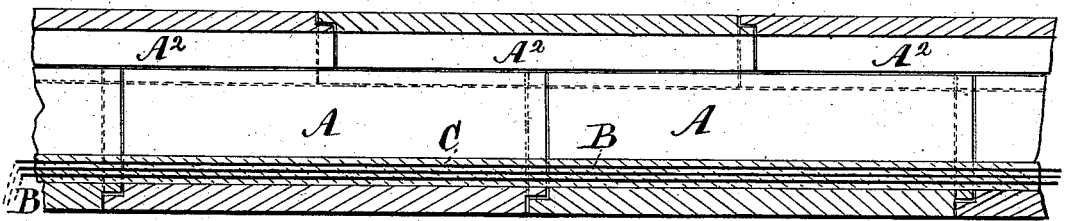
Figure 2:
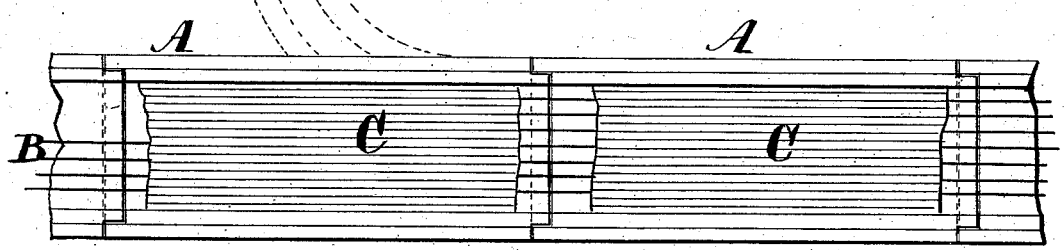
Figure 3:
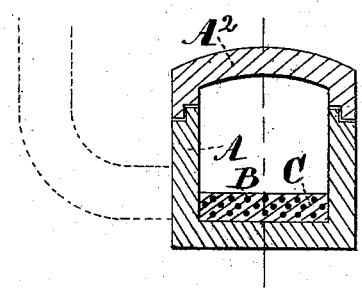

Figure 1 is a longitudinal vertical sectional view of an apparatus which may be employed in carrying out our invention. Fig. 2 is a top view of the casing with the upper part or cover removed. Fig. 3 is a transverse vertical section.

The casing is made of non-metallic substance, preferably of glazed or vitrified terra-cotta or similar material. In some cases it may be of glass, if desired. It is made in sections of any suitable length. Each section consists of a lower part or trough, A, and an upper part or cover, $A^2$, which, when placed together, form a tube. This tube may be, in its cross-section, either cylindrical or angular, as preferred.

As shown herein, the trough A is rectangular on its exterior surface, while its interior surface is formed with vertical walls and a rounded bottom. By this construction a flat exterior bottom surface is provided for it to rest upon, so as to insure the proper fitting of the ends of the sections to each other and prevent any lateral or rotary motion of the casing, while the rounding of the interior bottom surface strengthens the corners and also facilitates the laying of the insulating compound, which is hereinafter described.

The ends of the sections and the top edges of the trough are formed with lap-joints, as shown, and when in place these joints are sealed with cement of any suitable description.

The cover $A^2$ is formed with vertical sides and a rounded top, both interiorly and exteriorly, and its lower edges are formed with joints corresponding with those on the upper edges of the trough A, so that when in place it possesses the character of an arch, the better to sustain the weight of the earth above it. The ends are provided with joints similar to those on the ends of the trough.

When the upper part or cover is placed in position on the lower part or trough the sections are arranged so as to break joints, as shown in Fig. 1, by which means the entire tube or casing is made strong and substantial.

The tube or casing thus formed is adapted to receive wires which are insulated in any manner. We prefer, however, to use an insulating compound composed and applied as follows: Coal-tar, ten parts; pitch, six parts; rendered tallow, one part; potash, one-half part; total, seventeen and one-half parts. These ingredients are will mixed together in a vessel and heated to the boiling-point, and the compound is applied while hot. The potash is diluted with water before being mixed with the other ingredients. After a few hours exposure to atmospheric influences, and especially to moisture, the compound becomes hard and solid.

In using our invention we proceed as follows: The lower part or trough, A, is first laid in the trench prepared for the purpose, the end joints being cemented, as before described. A layer of the compound is then spread on the bottom of the trough. The wires B, coated with the compound, are placed in position in the trough, and another layer of the compound spread over them, so that they occupy a position similar to that shown in the drawings, in which C represents the compound. The cover $A^2$ is then placed in position and the joints sealed, and the trench is then filled up.

The tube or casing may be provided with elbows or lateral branches at desired points, for the purpose of conducting some of the wires away from the main line along side streets or upward into houses. In such cases a certain section is provided with the desired elbow, as is done with water and gas pipes. The branches are illustrated by dotted lines in Figs. 2 and 3 of the drawings.

Among the advantages possessed by our invention are the following: The material renders the tube or casing indestructible, and, being non-metallic and a non-conductor, the wires could not be affected thereby, even if not insulated. The construction and mode of laying the tube facilitates the operation of laying the wires at the outset, and afterward facility is afforded for access to the interior of the tube by removing only the cover without disturbing the lower part or trough. The form of the tube insures its being properly placed and retained in position, and enables it to sustain the weight of the earth above it.

The insulating compound is a sure and permanent protection to the wires. It is impervious to air and water, and is not affected by any of the chemical actions which take place under ground, nor by any degree of temperature below 200° Fahrenheit. It is composed of simple and well-known ingredients, and is easily prepared and applied without the necessity for any degree of learning or skill on the part of the workman. It is cheap, durable, and permanent, and is a perfect insulator. Moreover, it entirely obviates the necessity for galvanizing the wires, and thus saves an expense equal to nearly one-half of the original cost of the wire.

When used on draw-bridges independently of the tube or casing, the insulating compound may be improved by the addition of oakum, which will render it more elastic and less liable to crack. In such cases the wires may be twisted in the form of a cable and wrapped with coiled wires, if desired.

We make no claim to the construction of casing, inasmuch as such forms no part of our invention, but is represented and described to illustrate one means of using the insulating compound.

We do not claim, broadly, a tube or casing made in sections or in two or more parts, as we are aware that such features are not new.

What we claim as new, and desire to secure by Letters Patent, is—

The compound for insulating telegraph-wires herein described, consisting of a combination of coal-tar, pitch, tallow, and potash, substantially as described.

JOHN VAN WINKLE.
FELIX DONNELLY.

Witnesses:
E. R. BROWN,
JAMES H. HUNTER.